(12) United States Patent
Kulik

(10) Patent No.: US 6,392,672 B1
(45) Date of Patent: May 21, 2002

(54) ADDING METHOD FOR ORDERED SORTING OF A GROUP OF WINDOWS ON A DISPLAY

(75) Inventor: Amy Louise Kulik, Austin, TX (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/398,376

(22) Filed: Sep. 17, 1999

(51) Int. Cl.[7] ................................................. G06F 3/00
(52) U.S. Cl. ........................ 345/781; 345/806; 345/803; 345/783
(58) Field of Search ................................. 345/764, 781, 345/783, 806, 788, 799, 803

(56) References Cited

U.S. PATENT DOCUMENTS

| | | | | |
|---|---|---|---|---|
| 5,305,435 A | * | 4/1994 | Bronson | 345/777 |
| 5,390,295 A | * | 2/1995 | Bates et al. | 345/789 |
| 5,621,880 A | * | 4/1997 | Johnson | 345/783 |
| 5,856,826 A | * | 1/1999 | Craycroft | 345/788 |
| 6,043,817 A | * | 3/2000 | Bolnick et al. | 345/788 |

* cited by examiner

Primary Examiner—John Cabeca
Assistant Examiner—Kieu D. Vu
(74) Attorney, Agent, or Firm—Foley & Lardner

(57) ABSTRACT

In modern display systems, such as cable boxes, there is often a requirement to create displays with several windows containing independent content. The content may come from different programs running within the system and may also come from real time video inputs such as satellite TV signals, DVD players, cable companies, and the like. In such applications the on screen display can be created on a line by line basis. Often the display lines can be created as they are being used. To create these display lines it is necessary to sequence the data to the display in the order which it will be displayed. To sequence the data to the display in the order which it will be displayed the windows must be sorted by their position on the screen. To sort the windows by their position on the screen such methods as doing a bubble sort of the window's starting coordinates is often used. The present invention presents a method and apparatus that compares the position of the window to the others on the same line and then numerically adds the results. The numerical value of the results then directly gives the order in which the window will be displayed.

16 Claims, 9 Drawing Sheets

FALSE = 0   TRUE = 1

| X= | A | B | C | D |
|---|---|---|---|---|
| A<X | 0 | 1 | 0 | 1 |
| B<X | 0 | 0 | 0 | 0 |
| C<X | 1 | 1 | 0 | 1 |
| D<X | 0 | 1 | 0 | 0 |
| SUM | 1 | 3 | 0 | 2 |

TABLE #1

| X= | A | B | C | D |
|---|---|---|---|---|
| A<X | 0 | 1 | 0 | 1 |
| B<X | 0 | 0 | 0 | 0 |
| C<X | 1 | 1 | 0 | 1 |
| D<X | 0 | 1 | 0 | 0 |
| SUM | 1 | 3 | 0 | 2 |

TABLE #2

FIG. 6

ADDING METHOD FOR ORDERED SORTING OF A GROUP OF WINDOWS ON A DISPLAY

BACKGROUND OF THE INVENTION

1. Field of the Invention

This invention relates, in general, to a system and method for handling multiple windows displayed on a display device, and in preferred embodiments, to a method for determining the order of display of windows on a display device, where parts of the windows occupy the same horizontal line of display.

2. Background of the Invention

In their earliest forms, display systems such as televisions or computer monitors displayed a single program or series of images from a single source, such as a selected television station or program. Within the field of television, a "picture-in-picture" system was developed. The "picture-in-picture" system allowed a television to display a television program on the entire screen, in conventional format, and in addition to display a smaller picture from a different channel, in shrunken form, on the same screen. In essence, such systems comprised two television pictures on one screen, a main picture comprising a standard television picture and a smaller subpicture called the PIP ("picture-in-picture"). Typically, the PIP was less than ¼ of the size of the screen. The PIP ordinarily resided in the lower right quadrant of the main picture, though with a border of the main picture surrounding the PIP. Typically, the PIP provided an apparently complete image of the second channel to the viewer. In actuality, various bits of information, commonly denominated as pixels, were dropped from the actual displayed PIP, given the relatively smaller size of the PIP, the image appeared substantially complete to the viewer.

Analog television technology generally did not permit the displaying of multiple images from multiple channels, such as in a PIP system. In the case of analog television technology, the main picture set to a first channel was derived from a first television station and the second channel for the PIP was derived from a second television station. Since the analog television system displayed images via a raster scanned CRT, where the image information was received via the broadcast and synchronized with the monitor by a timing pulse (sync pulse), there was no necessary correlation for synchronization between the two channels. By way of example, one channel could be scanning the upper left portion of the picture while the second channel would be scanning the bottom left portion of the picture. Synchronization in analog systems was generally not feasible.

Digital electronics has facilitated the generation of overlapping displays. In certain versions, a main picture was generated and displayed as before. The PIP was generated by a PIP circuit which stored images, or selected pixels of the image, coming from the second channel. Information regarding the scanning location on the main picture was provided to the PIP circuitry. Through this synchronization, the PIP circuitry provided output to the screen or monitor at the appropriate time. The image information in the PIP circuitry was stored in digital memory. That image information was updated as received from the channel. In this way, the raster scanned display provided the main picture, as received, from the television station and the PIP circuitry provided a imperceptibly delayed PIP. In this way, the synchronization problem was overcome.

In computer systems, the difficulty of displaying more than one source of information on a display was somewhat mitigated by the fact that the information, to be displayed was typically coming from a single source, i.e. from within the computer. A computer display may contain various windows produced by different programs, but because the display data is being produced by a single source, there is no synchronization of scans to accommodate. Such display windows typically contained static information and a graphics memory, and could be built from such information, prior to being displayed.

Modern display applications, such as in set top boxes, are producing display requirements that incorporate the requirements of a picture in picture display, as well as the requirements of a computer windowing display, in a single application. Modern display applications are producing requirements that are more demanding than picture in picture displays on a television, or windowing displays on a computer. For example a set top box may require the display of several video inputs, on several display windows, along with several program generated displays, such as channel displays, electronic program guides (EPG), and the like in other windows. These requirements may also include displays which turn on and off, or spontaneously change display positions, such as closed caption displays. In addition the resolution of displays has continually increased, raising the amount of data which must be displayed to form a picture. Because of the more demanding display system requirements, manufacturers have increasingly sought efficient display methods and apparatus. In some applications display lines are constructed shortly before the need to display them. Constructing display lines shortly before using them has an advantage in that the less time that is needed between the construction of the line and the display of the line, the less memory that will be required to contain the line data between the time it is constructed and the time it is displayed. In other words if a display line could be constructed as it were used, then there would effectively be no need to store any intermediate data before being displayed. As the time between constructing the lines and displaying the lines increases so does the amount of display memory required. Typically display memory is a higher speed and more expensive memory than system memory. High speed display memory is also commonly integrated into the display chip, where space is at a premium.

In applications, where display lines are constructed shortly before the need to display the line, the need arises to include data from several windows on the same display line. To include several windows on the same display line, a given display line must be constructed from the data, from the windows to be displayed. The data from the various windows, to be displayed on a screen, must be combined to produce a display line. The order in which the data from several windows is combined is dependent on the position of the windows of the display. Because the memory requirements, for display line storage, increases as the time to construct a display line increases, methods for quickly and easily determining the order in which the data from the windows are combined can reduce memory requirements. Techniques and apparatus which can reduce memory requirements are needed within the art.

SUMMARY OF THE DISCLOSURE

To overcome the limitations in the prior art described above, and to overcome other limitations that will become apparent upon reading and understanding the present specification, the present disclosure encompasses a novel method of sorting windows which appear on the same line of a display.

Windows need to be sorted for a variety of reasons. For example when creating a display line which displays a number of windows the data for the display line,may be inserted into a display queue. To insert the data into the display queue in the proper order the windows need to be sorted so that the data from the window to be displayed first is inserted into the display queue first.

In an illustrative example of the method a line to be displayed is selected. A first window, which is to be sorted because it appears on a line to be displayed, is selected. The starting position of the first window is then compared top all other windows which appear on the same line to be displayed. The result of the comparison is assigned a numerical value, for example a 1 if the window appears on the display before the first window and a 0 if the window does not appears on the display before the first window. The first window is compared, in the fashion just described, to all other windows which appear on the line to be displayed. All the values of the comparisons are then added and the resulting sum assigned to that window. The resulting sum of the comparisons will equal a number which is indicative of the order, in which the window to be sorted appears on the line to be displayed, in comparison to the other windows. By repeating the just described procedure with every window on the line the windows will be assigned numbers which are indicative of the order the windows appear.

Another aspect of the present invention is that a system, in accordance with the principles of the present disclosure, may include a hardware implementations of the method, thereby altering the performance of the system. By comparing the starting window positions using hardware comparators instead of software all comparisons may easily be made in parallel, so that the time to make any number of comparisons is the same as the time it takes to make a single comparison. The comparison time does not increase as more windows are added. The result of the comparisons may also be added in a hardware implementation, so that the addition of any number of window comparisons will take the same amount of time as the addition of the results of the comparisons for one window. These hardware techniques can significantly speed up the determination of window order on a display, thereby reducing the amount of intermediate data storage that is needed when the window order is determined.

These and various other advantages and features of novelty, which characterize the invention, are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 6 is a set of tables illustrating examples of additive aspects of embodiments of the present invention.

DESCRIPTION OF PREFERRED EMBODIMENTS OF THE INVENTION

In the following description of exemplary embodiments, reference is made to the accompanying drawings which form a part hereof, and in which is shown by way of illustration the specific embodiment in which the invention may be practiced. It is to be understood that other embodiments may be utilized, as structural changes may be made without departing from the scope of the present invention.

Figure 1:
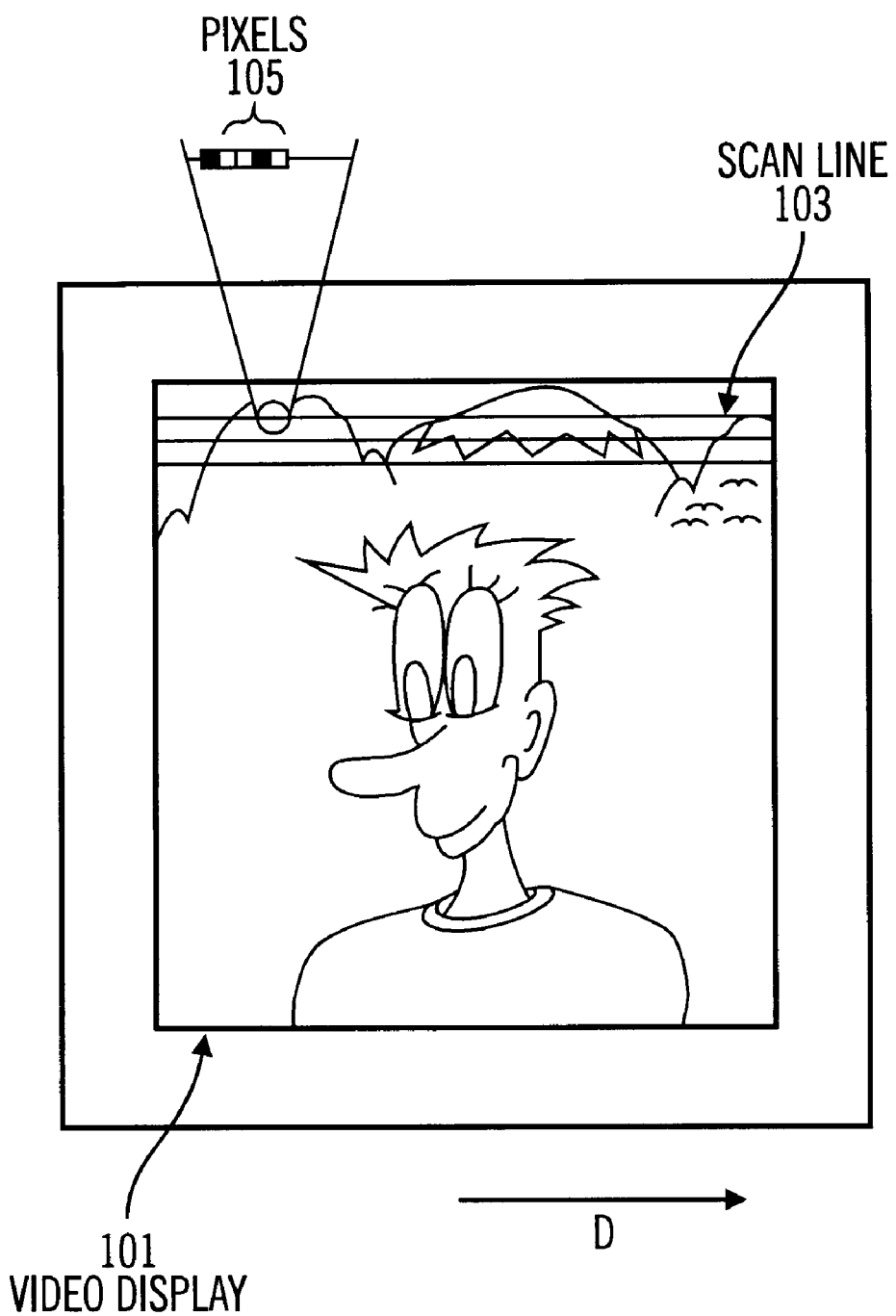
FIG. 1 is a representation of a video display, as may be used with embodiments of the present invention.

FIG. 1 is representation of a Video Display 101. The illustrated display is of the scanned type as may be found on a computer display or television CRT. The picture is formed by scanning an electron beam across the face of the CRT. The face of the CRT contains phosphors that give off light as the electron beam scans across it. Commonly each scan line contains a number of individual picture elements commonly referred to as pixels. A number of Pixels 105, are contained in each scan line. The number of pixels per line determines horizontal resolution of the resulting picture. The number of scan lines determines the vertical resolution.

Figure 2:
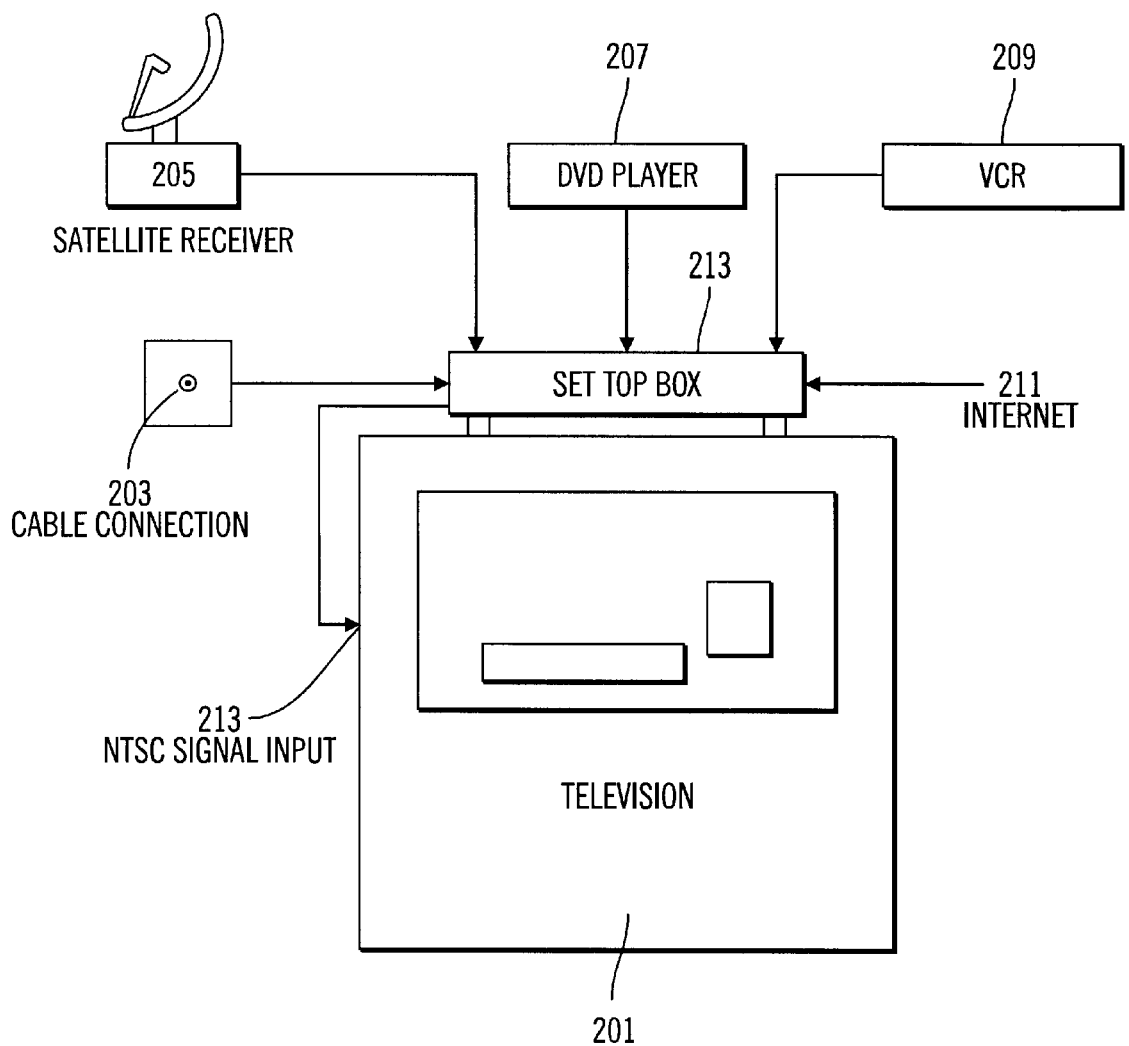
FIG. 2 is an example hardware environment for the invention, an embodiment of which resides within a Set Top Box.

FIG. 2 is an example environment for the invention. In FIG. 2 a Set Top Box 213, provides signals to a Television 201, for display. A Set Top Box 213, is a computerized video processing unit designed to produce signals that may be displayed on a television receiver, e.g. in NTSC (National Television Systems Committee) format. Cable boxes, for example, can require to provide simultaneous display of several sources of video within one picture, on an NTSC format TV screen.

The NTSC format is currently the predominant standard of television receivers in use within the United States. Because of advances in television broadcasting and reception in recent years, several other standards have been developed. To display new standards it is necessary to have a television capable of displaying the new standards, or have some kind of converter unit, which can take signals encoded using the new standards and convert them into NTSC compatible signals for display on a standard television receiver. Set Top Boxes can provide not only format conversion of television signals but also provide a variety of other services, such as providing a platform for pay per view movie capability, providing Electronic Program Guide (EPG), as well as providing set up and control menus. As shown in the example Set Top Box environment of FIG. 2 a Set Top Box 213, may contain a variety of inputs and outputs. Set Top Boxes can be used with Satellite Receivers, such as 205. The Set Top Box 213, may take a feed from a Satellite Receiver 205, in MPEG (Motion Pictures Expert Group) format and convert it so that it might be received by an NTSC signal input 213, of a Television 201. The Set Top Box 205, might also be capable of receiving a Video Input such as produced by a DVD (Digital Versatile Disc) player 207, and provide an NTSC Input 213, to the Television 201. The Set Top Box 213, is also commonly used to decode Cable Connection 203, signals which may be scrambled by a cable company to prevent unauthorized reception, without a Set Top Box 213.

Figure 3:
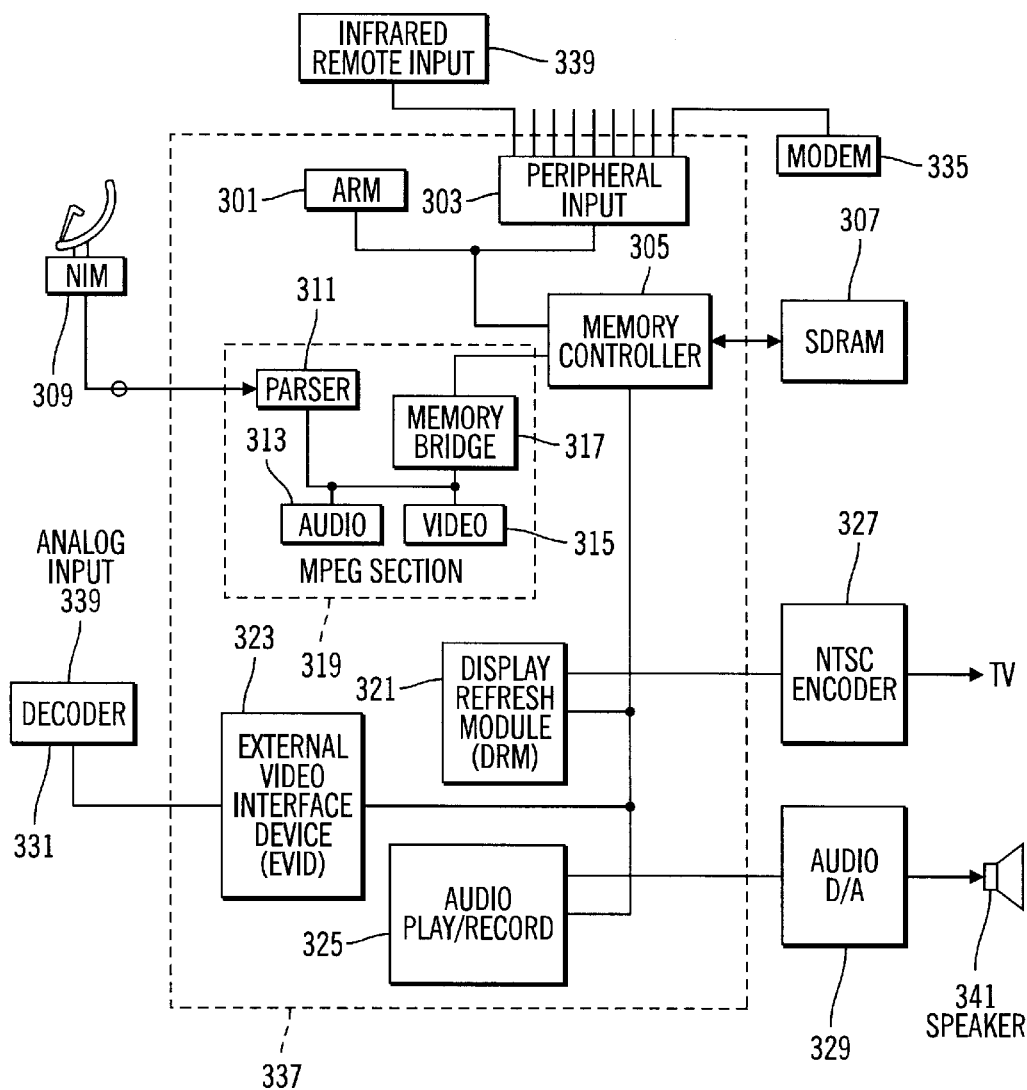
FIG. 3 is a block diagram of an example configuration of an Integrated Circuit Chip (337), for use in a Set Top Box (213), which contains a preferred embodiment of the invention.

FIG. 3 is a block diagram of an example Integrated Circuit Chip 337, designed to be used in a Set Top Box 213, which will be used to illustrate aspects of the invention. A preferred embodiment of the invention may be found within the Display Refresh Module (DRM) 321, within the integrated circuit chip 337. The embodiment of the invention within the DRM 321, will be used to illustrate the invention.

The Integrated Circuit Chip 337, is a VLSI (Very Large Scale Integration) semiconductor chip. The Integrated Circuit Chip 337, contains several discrete sections which are illustrated as blocks in the block diagram of FIG. 3. The chip may receive data from a NIM (Network Interface Module) 309. One such NIM 309, is that provided by satellite receiver for receiving Direct Broadcast Satellite signals (DBS). A DBS receiver may provide an MPEG (Motion Picture Experts Group) digital video and audio signal stream (MPEG stream). The MPEG stream can be received by a Parser 311, which may then divide the MPEG stream into audio and video information. The audio information is coupled into the Audio block 313, of the MPEG Section 319. The video information is coupled into the Video block 315, of the MEG Section 319. A Memory Bridge block 317, interfaces the Video block 315 and the Audio block 313, of the MPEG Section 319 to the Memory Controller 305. The Memory Controller 305 controls access to system memory i.e. SDRAM (Synchronous Dynamic Random Access Memory) 307. Once the MPEG video and audio information has been placed in the SDRAM 307, it can be accessed through the Memory Controller 305. The Display and Refresh Module (DRM) 321, can request MPEG video information from the SDRAM 307, by making memory requests of the Memory Controller 305. The Display and Refresh Module (DRM) 321, can combine MPEG video information with other video information, such as closed caption data, and then provide the combined video information to the NTSC Encoder 327, which can format the information for display on a common television receiver. Similarly the Audio Play and Record module 325, can receive MPEG audio data by requesting the MPEG audio data from SDRAM 307, by making a request to the Memory Controller 305. The Audio Play/Record module 325, can take the MPEG audio data provided from SDRAM 307, by the Memory Controller 305, and decode it a digital audio stream. The digital audio stream can then be provided to the Audio Digital to Analog converter 329, which can then convert the signal into a form suitable to drive a speaker 341.

External video information may also be received by the Chip 337. For example an Analog Input 339, from a device such as a VCR, DVD, Laser Disc, Home Theater Tuner, or the like may be provided to a Decoder 331. The Decoder 331, can convert the Analog Input 339, to a digital form which may then be coupled to an External Video Interface Device (EVID) 323. The EVID may then store the digital representation of the Analog Input 339 to SDRAM, where it may be accessed by the Display Refresh Module (DRM) 321, and further processed or displayed.

The Integrated Circuit Chip 337, also has the capability of responding to and processing external inputs such as Infrared Remote Input 339, which may be used to control the Set Top Box 305, behavior, for example using a hand held infrared remote control. Other external inputs and outputs may be received by the Integrated Circuit Chip 337, via a Peripheral Input block 303. Bi-directional input and output, such as, for example, a Modem 335 connection may be coupled into the Chip 337, via the Peripheral Input block 303. Peripheral inputs may be processed by a computing resource, such as an ARM (Advanced Risc Microprocessor) 303, and then the resultant data communicated to the SDRAM 307, via the Memory Controller 305. The Display Refresh Module 321, which creates the actual picture to be displayed, may simultaneously display several of the external windows within the windows in that picture. The picture constructed by the Display Refresh Module 321, may also contain display windows generated within the Set Top Box 213 containing control menus, closed captions, an electronic program guide and the like.

Figure 4:
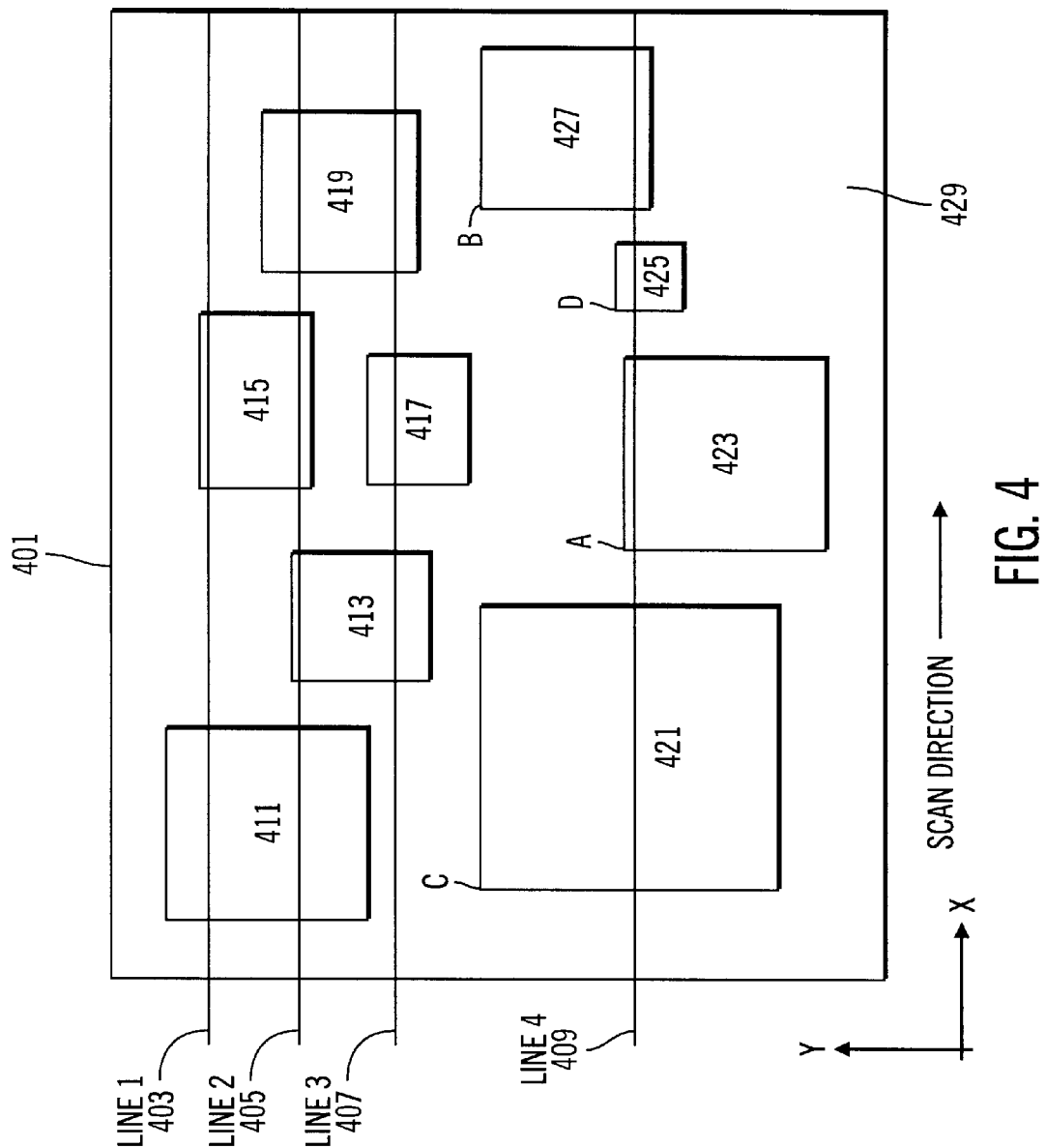
FIG. 4 is a two dimensional illustration of a scanned display on which a plurality of windows are displayed.

FIG. 4 is an illustration of a scanned Display 401, with a plurality of windows 411, 413, 415, 417, 419, 421, 423, 425, and 427. This Display is a type as may be found on computer or television display CRTs. Four exemplary scan lines line #1 403, line #2 405, line #3 407, and line #4 409, are illustrated. Assuming that a mechanism, such as a Display Refresh Module 321, is producing the display of FIG. 4, the Display Refresh Module 321, will have to fetch data to produce the plurality of windows on top of the Main Picture Display 429. The Display Refresh Module 321, does not produce a complete display at one time and store it in memory. The Display Refresh Module 321, produces each line as needed and may have only one line or even a part of a line in memory at one time. The display in FIG. 4 is scanned from left to right, in the direction labeled "Scan Direction". To display window 411 and 415 on line 1, data representing 411 should be fetched first. The data to produce window 417 will be needed first as the electron beam scans through window 411 prior to scanning through window 415. There fore to produce line 1 403, in the most efficient manner the Display and Refresh Module 403, would have fetch data representing window 411, first and then fetch the data representing the window 415, second. To produce line 2 405, in the most efficient manner, the Display and Refresh Module 403, would have fetch data representing window 411, first and then fetch data representing window 413, next followed by data representing window 417, and finally the data representing window 419. For line 3 407, the window data would have to be fetched from windows 413, 417 and 419 in that order, to operate in the most efficient manner. The order of fetching data from windows can and does change from line to line. To ascertain the order of fetching data a traditional method which was employed was to compare the starting coordinates (in the X or scan direction) of each window. For example in line 4 409 the starting X coordinate of window 421 is C, the starting X coordinate of window 423 is A, the starting X coordinate of window 425 is D, and the starting X coordinate of window 427 is B. The starting X coordinates could be sorted using methods well known in the art such as bubble sort.

Figure 5:
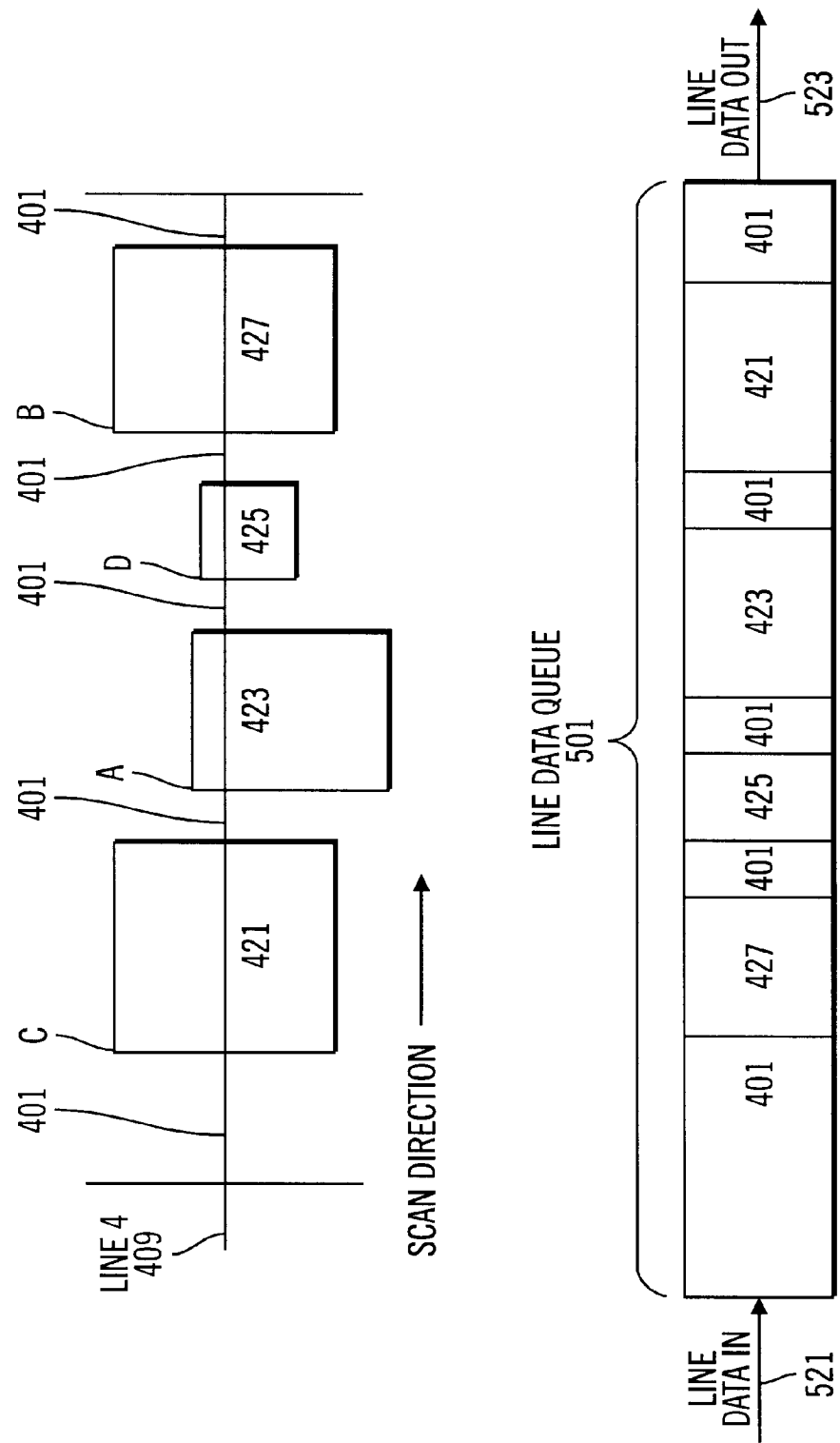
FIG. 5 is an illustration of an example display line, illustrating an example relationship between the data which produces the line and the actual line displayed.

FIG. 5 is an illustration of an example line, line 4—409, illustrating the relationship between the data which produces the line and the actual line displayed. Four windows, 421, 423, 425, and 427, are displayed on line 4—409, in addition portions of the background or main picture 401, on which the windows are overlayed, are also displayed. The background or main picture 401 may be a video stream or it may be a static background, such as a blue screen. Line 4—409 is constructed by placing data, in the order to be displayed, in the Line Data Queue 501. As the data to be displayed, from each window, is fetched it is placed in the Line Data In end

521, of the Line Data Queue 501. The data 401 may be inserted in the line queue 501 along with the window data. However, if the background or main picture 401 is a static image, such as a blue screen, it may be more convenient to only insert the window data in the Line Data Queue 501, and then switch in the static image before at the proper times before the image is displayed. As the data is displayed it is removed from the Line Data Out end 523, of the Line Data Queue 501. The smaller the time interval between the inserting of the data into the Line Data In end 521, of the Line Data Queue 501, and the removal of the data from the Line Data Out end 523, of the Line data Queue, the smaller the Line Data Queue 501 can be. The smaller the Line Data Queue 501, the less memory that will be required to make up the Queue. Because of the desirability of minimizing memory requirements the process of inserting data into the Line Data Queue 501, should be as fast as possible. In order to minimize the length of the Line Data Queue 501, the data from each window should be fetched in the order it is used. If it were not fetched in the order used, intermediate storage would be needed to store the data temporarily prior to inserting the data into the Line Data Queue 501. In the FIG. 5 example there are 4 windows being displayed on line 4–409. Window 421, is the first to be displayed, followed by 423, 425, and 427. In order to minimize memory requirements the data from window 421 should be fetched first, followed by windows 423, 425, and 427, in order to minimize the time between the fetching of the window data and the display of the data.

To determine which windows that data should be fetched from first the horizontal left most position (See FIG. 4) positions of the windows can be compared. Because the scan direction is from the left to right the windows with the lowest value of X coordinate should be fetched first. Windows 421, 423, 425, and 427 have leftmost X coordinates of C, A, D, and B respectively, as shown in FIG. 4. To decide which window's data should be fetched first the values of C, A, D and B need to be compared. There are various methods of comparison, such as the bubble sort, which are well known in the art. Most methods involve a series of comparisons for each window.

Windows which overlap can also be handled quite easily by embodiments of the invention by examining only window transitions on the particular display line. For example if a smaller window were completely contained in a larger window, the larger window would be treated as being two separate windows, one which proceeded the smaller window and one which followed the smaller window.

Figure 7:
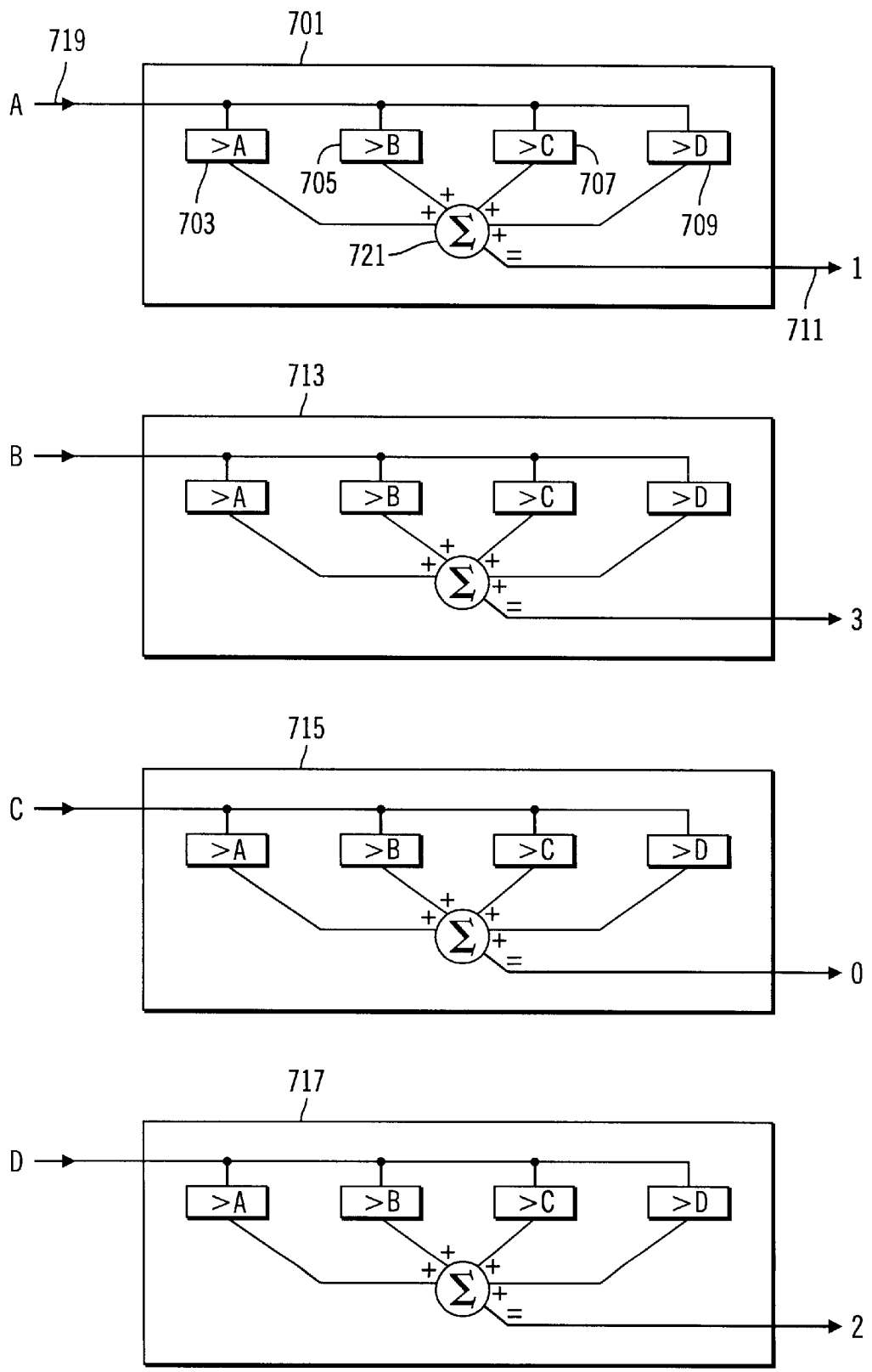
FIG. 7 is a block diagram of charts illustrating the additive method according to a preferred embodiment of the invention.

FIG. 7, table #1 illustrates a preferred embodiment of the invention. In table #1, each starting window coordinate, for line 4–409, is compared to all the other starting window coordinates. A value of 1 is assigned to the comparison, if it is true, and a value of 0 is assigned to the comparison, if it is false. In the second column of table 1, the only comparison which is true is that A>C, and thus receives a "1" or true. All the other comparisons are false, and thus receive a "0" entry. Similarly in the third column of the table B is compared with all other starting points. In the third column A<B, C<B, and D<B are true and receive "1", or true, and the only comparison that is false is the B<B, it receives a "0" or False entry. By making similar comparisons in columns four and five table #1 of FIG. 4 results. By adding the results of each comparison the sums in row six of table 1 result. A has a sum of 1, B has a sum of 3, C has a sum of 0, and D has a sum of 2. The sum row gives the order that the data for the windows should be fetched in, i.e. C=0, A=1, D=2, and B=3. By adding comparisons and additions the order that data needs to be fetched from any number of windows can be determined. Since a comparison of a coordinate with itself, for anything except equality, will always be false one comparison can be eliminated from each row. Table #2 illustrates, via the darkened entries, that all the table comparisons of an object with itself have a result of 0, and therefore those comparisons may be eliminated.

FIG. 7 is a block diagram of preferred embodiment of the invention. FIG. 7 is an illustration of a hardware embodiment, used to illustrate the principles of the invention. In FIG. 7, four different comparison blocks are used, i.e. 701, 713, 715 and 717. The functioning of each comparison block is identical, only the input and output will changes from block to block. FIG. 7 illustrates how a four window situation, such as line 4–409, might be handled in an all hardware embodiment of the invention. The value of A, the starting X position of window 423, is coupled into the comparator via input 719. The A value is further coupled into comparison blocks 703, 705, 707, and 709 where the value of A is compared to see if it greater than A in block 703, greater than B in block B 705, greater than block C in 707, and greater than block D in 709. The results of the comparisons are then summed in summation block 721, and coupled into an output 711. In the present example the comparator 703, compares A>A. The resultant output of the comparison is 0. The comparator 705, compares A>B, the resultant output of the comparison is 0, because A is not greater than B. The comparator 707, compares A>C. The resultant output of the comparison is 1, because A is larger than C. The comparator 709, compares A>D. The resultant output of the comparison is 0, because A is not larger than D. The output of the comparators 703, 705, 707, and 709 are summed in summation block 721, and coupled from block 701 on output 711. The output of block 701 is 0+0+1+0=1. The same process is followed with the remaining three comparison blocks. The output from block 713 is 3, the output from block 715 is 0, and the output of block 717 is 2. Thus the output of the comparison blocks is equal to the order in which the window data must be fetched.

C, which is the starting coordinate of the 421 window, is provided as an input to comparator block 715. The output of comparator block 715 is 0 indicating that the window with the starting X coordinate of C, i.e. window 421 must have its data fetched first. The output of comparison block 701 is 1, indicating that window 423 must have its data fetched second. The output of comparison block 717 is 2, indicating that window 425 must have its data fetched third. The output of comparison block 701 is 1, indicating that window 423 must have its data fetched second. The output of comparison block 713 is 3, indicating that window 427 must have its data fetched last.

Figure 8:
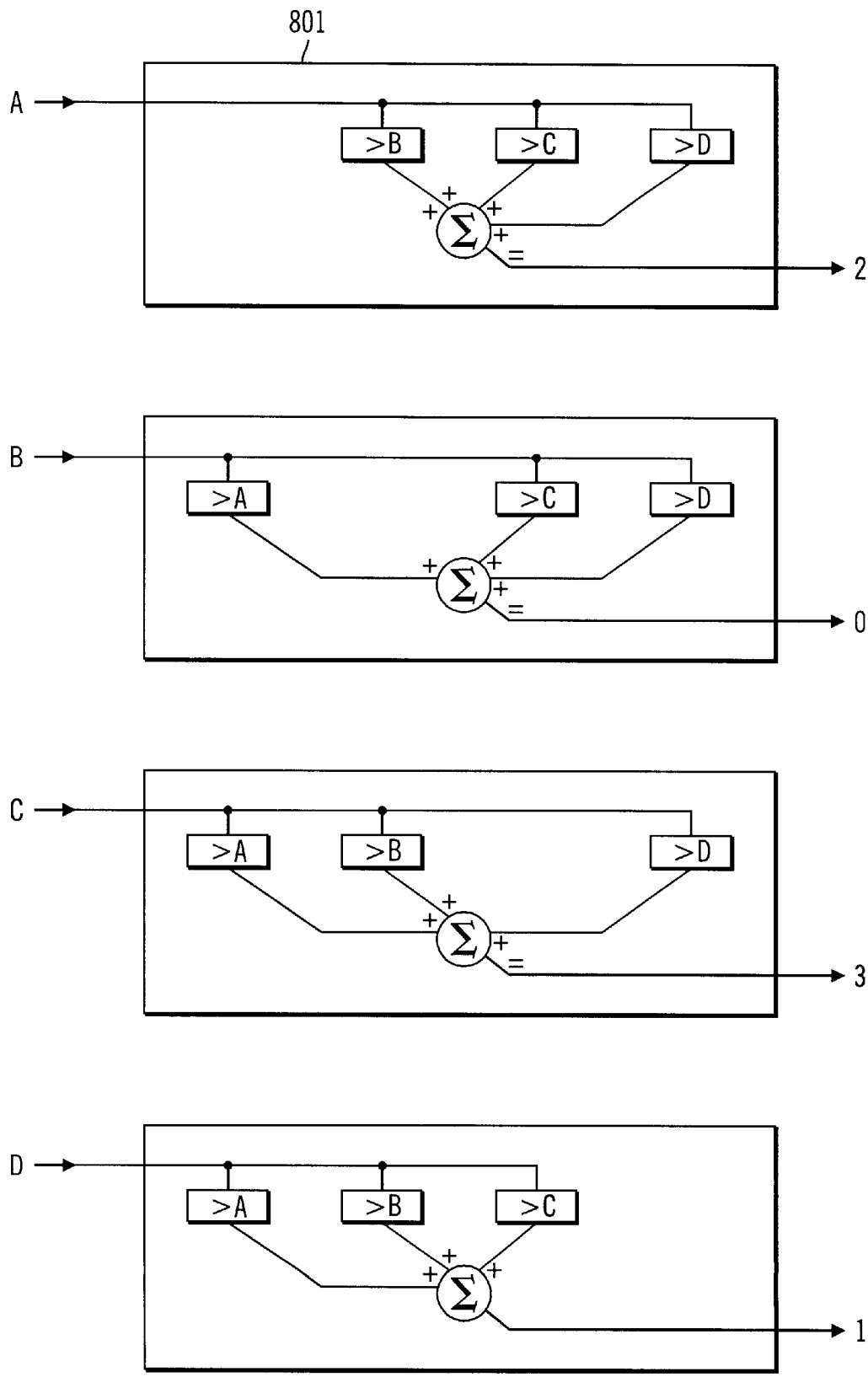
FIG. 8 is a block diagram of an example hardware implementation according to a preferred embodiment of the invention.

FIG. 8 is an embodiment which functions identically with the embodiment of FIG. 7. In FIG. 8 all of the comparisons, which compare a coordinate with itself have been eliminated. Because those comparisons, which compare a coordinate with itself, always evaluate to 0, those comparisons can be eliminated.

Figure 9:
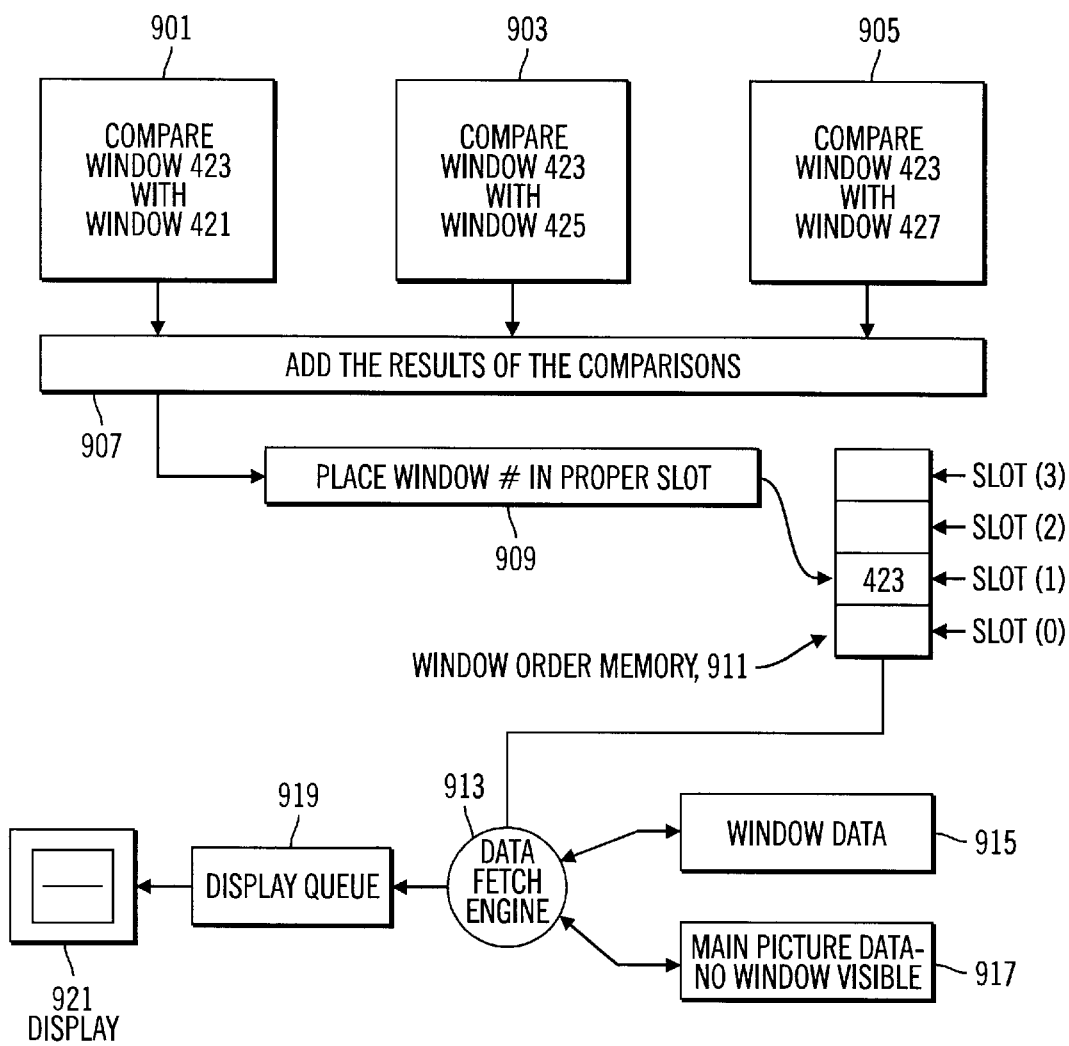
FIG. 9 is a block diagram of a simplified example hardware implementation, in which the unnecessary comparisons illustrated in FIG. 8 have been eliminated, according to a preferred embodiment of the invention.

One of the properties of this additive method for sorting a group of windows on a display is that it is realizable as a hardware, software, or hardware and software method. For example all the comparisons in FIG. 7 can be accomplished via software or hardware, the and the summations can also be accomplished in software or hardware. Additionally one hardware comparison block, e.g. 701 can be used, and software can be programmed to sequentially couple in the A. B, C, and D coordinates into that hardware block, e.g. 701. The results for each window can then be obtained sequentially for each comparison. The method can also be in an all hardware embodiment as shown in FIG. 7. One feature of the hardware implementation is that it is extensible and any number of windows can be sorted without a speed penalty. In other words the order of the windows is produced by two operations. The first operation is a compare step, in which all the comparisons can be made simultaneously, i.e. in parallel. The simultaneous comparisons may be made in various ways well known in the art. For example this type of simultaneous comparison made be made in hardware, as illustrated in FIG. 8 and FIG. 9, or by some multiprocessor computing means or SIMD (Single Instruction Multiple Data) machines, which may be designed with an instruction (s) for this type of operation. The second operation is the addition of all the compare steps. The speed of the method, when implemented in an all hardware embodiment, is limited only by the time that the comparisons and additions take.

FIG. 9 is block diagram of a preferred embodiment of the invention, illustrating an example implementation of the invention using line 4-409 as displayed in FIG. 4. In the display of line 4-409, four windows 421, 423, 425 and 427 are encountered. FIG. 9 illustrates the processing of window 423. In blocks 901, 903 and 905 the starting position of window 423 (A), is compared with the starting positions of windows 421 (C), 425 (D), and 427 (B) respectively. The results of each comparison is coupled into block 907, where the results are added. In the present example the result of the comparisons is 1, as shown in FIG. 6 Table #2, in the A column. Block #909 then places window 423, into Window Order Memory 91 1, in Slot(1). The Window Order Memory 911, can be a queue in which references to the sorted windows have been placed. Slot (0) of the Window Order Memory 911, is where the reference to the first window data, to be fetched, is placed. Slot (1) of the Window Order Memory 911, is where the reference to the window data to be fetched second is placed, etc. In the present example 423, the window being processed, is inserted into Slot (1) of the Window Order Memory 911, is where the reference to the window data to be fetched second is placed. Slot (0) of the Window Order Memory 911, is coupled into a Data Fetch Engine 915, which fetches either the actual data or pointers to the data for the Window Data 915, or the Main Picture Data 917, which is what the windows are displayed on top of and which is visible when no windows are displayed. The Data Fetch Engine 913, places the data (or the pointers to the data) in the Display Queue 919, and will be used to produce Line 4–409, of the display 921. The blocks of the embodiment, illustrated in FIG. 9, as will be immediately recognized by those skilled in the art, may be realized in a variety of hardware and/or software means. The implementation is dependent on the desired characteristics of the implementation, the inventive concepts herein apply to any implementation regardless of its realization technology.

The all software implementation, in which each comparison and addition is programmed, is the slower, in general, than comparable hardware implementations, but may have the smallest hardware cost. The all hardware implementation can be the fastest, but may be the most costly in terms of hardware. Any speed between the fastest and slowest can be achieved by varying the hardware, software trade off, and so the method exhibits total flexibility.

There are also variations within an all hardware method. For example all of the comparisons can be done in parallel if there are enough comparators to do all the comparisons simultaneously. Further only a single comparator can be used repeatedly to sequentially make the comparisons. Any variation between the forgoing hardware extremes can be used, depending on the requirements of the particular implementation that is sought to be achieved.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

I claim:

1. A method for sorting windows, which appear on the same line in a display, the method compromising:
   providing a plurality of windows to be sorted by their starting positions;
   selecting a first window from a plurality of windows;
   comparing the starting position of the first window with the starting position of each other window in the plurality of windows;
   assigning a value to each comparison, whereby the value assigned to the comparison is a first value if the starting position of the compared window is greater than the starting position of the first window, and the value assigned to the comparison is a second value, if the starting position of the first window is less than the starting position of the chosen window;
   adding the values of all the comparisons with a chosen window to form a comparison sum; and
   using the comparison sum as an index to sort the windows relative to each other window, to which it was compared.

2. A method, as in claim 1, wherein the comparison is assigned a value of 0 if the chosen window is the same as the window to which it is compared.

3. A method, as in claim 1, wherein the comparison is assigned a value of 1 if the chosen window is the same as the window to which it is compared.

4. A method, as in claim 1, wherein the step of making comparisons between a chosen window's starting position and each other window's starting position further comprises making a plurality of comparisons simultaneously.

5. A method, as in claim 1, wherein the step of making comparisons between a chosen window's starting position and each other window's starting position further comprises making comparisons between each window and every other window simultaneously.

6. A method, as in claim 1 further comprising:
   fetching data from the windows in an order dictated by the comparison sum.

7. A method, as in claim 6 further comprising:
   placing the data fetched from the windows in a line data queue.

8. A method, as in claim 6 further comprising:
   placing pointers to the data fetched from the windows in a line data queue.

9. A method for sorting windows which appear on the same line in a display, the method compromising:
   providing a plurality of windows to be sorted by their starting positions;
   selecting a first window from the plurality of windows;
   comparing the starting position of the first window with the starting position of each other window in the plurality of windows;
   assigning a value to each comparison, whereby the value assigned to the comparison is a first value if the starting position of the compared window is greater than the starting position of the first window, and the value assigned to the comparison is a second value, if the starting position of the compared window is less than the starting position of the first window;

adding the values of all the comparisons with a chosen window to form a comparison sum; and using the comparison sum as an index to a window order memory slot in order to write a reference to the window associated with the comparison sum.

10. A method, as in claim 9 further comprising:

using the elements of the window order memory to fetch window data in the order that the elements are placed in the window order memory;

placing the window data in a display queue in the order fetched.

11. A method, as in claim 9 further comprising:

using the elements of the window order memory to fetch window data pointers in the order that the elements are placed in the window order memory;

placing the window data pointers in a display queue in the order fetched.

12. A method as in claim 9 wherein the step of using the comparison sum as an index to a window order memory slot in order to write a reference to the window associated with the comparison sum comprises using the comparison sum as an index to a window order memory queue in order to write a reference to the window associated with the comparison sum.

13. An apparatus for sorting windows which appear on the same line in a display, the apparatus compromising:

a plurality of comparators for comparing a given window's starting coordinate with the starting coordinates of all the other windows on the same line and outputting differing values dependent on the result;

an adder, for accepting the outputs of the comparators and producing a sum of the outputs of the comparators;

a circuit for receiving the sum of the outputs of the comparators and placing references to the given window in an order dependent on the value of the sum of the outputs of the comparators a circuit for fetching the data from the windows to be displayed in a sequential order dependent on the order of the references to the windows to be displayed: and a display whereby the display comprises windows displayed in the order that their data was fetched.

14. An apparatus as in claim 13 wherein the circuit for receiving the sum of the outputs of the comparators and placing references to the given window in an order dependent on the value of the sum of the outputs of the comparators places the reference in order by placing them in a queue structure.

15. An apparatus as in claim 13, wherein the references to the given window comprise the data to be displayed on the selected display line.

16. An apparatus as in claim 13, wherein the references to the given window comprise pointers to the data to be displayed on the selected display line.

* * * * *